United States Patent
Aigner et al.

(10) Patent No.: US 7,100,973 B2
(45) Date of Patent: Sep. 5, 2006

(54) RADIATOR GRILLE FOR ASSEMBLY IN A RADIATOR GRILLE ARRANGEMENT

(75) Inventors: Ali Aigner, Stuttgart (DE); Marc Huttenlocher, Nurtingen (DE)

(73) Assignee: Decoma (Germany) GmbH, Sulzbach (DE)

( * ) Notice: Subject to any disclaimer, the term of this patent is extended or adjusted under 35 U.S.C. 154(b) by 0 days.

(21) Appl. No.: 10/956,626

(22) Filed: Sep. 8, 2004

(65) Prior Publication Data
US 2005/0093341 A1 May 5, 2005

(30) Foreign Application Priority Data
Sep. 8, 2003 (DE) ................. 103 41 983

(51) Int. Cl.
*B60R 27/00* (2006.01)
(52) U.S. Cl. .................... 296/193.1
(58) Field of Classification Search .......... 296/193.1, 296/193.09, 193.11, 187.03, 187.04, 187.09, 296/181.1–2, 181.2; 293/115, 154, 155; 180/274; 49/50
See application file for complete search history.

(56) References Cited

U.S. PATENT DOCUMENTS

| | | | |
|---|---|---|---|
| 1,064,948 A | | 6/1913 | Wheeler |
| 1,154,478 A | | 9/1915 | Braddy |
| 3,792,889 A | * | 2/1974 | Fuener et al. ............... 293/115 |
| 4,944,540 A | | 7/1990 | Mansoor et al. |
| 5,403,048 A | * | 4/1995 | Ekladyous et al. ......... 293/115 |
| 5,482,336 A | * | 1/1996 | Rouse et al. ................ 293/115 |

FOREIGN PATENT DOCUMENTS

| | | | | |
|---|---|---|---|---|
| DE | 4238725 | * | 5/1994 | ................. 293/115 |
| JP | 5069784 | * | 3/1993 | ................. 293/115 |
| JP | 6219224 | * | 8/1994 | ................. 293/115 |
| JP | 6219225 | * | 8/1994 | ................. 293/115 |

\* cited by examiner

Primary Examiner—H Gutman
(74) Attorney, Agent, or Firm—Clark Hill PLC

(57) ABSTRACT

A radiator grille arrangement for a motor vehicle includes first and second fastening mechanism for securing a radiator grille in place. The first and second fastening mechanism are spaced apart from one another substantially corresponding to a vertical extent of the radiator grille. The first fastening mechanism is provided on a lower edge of the radiator grille and is non-releasable. The second fastening mechanism is formed by a guide link device consisting of a groove and a pin guided therein. The groove at least partially extends in a longitudinal axis of the motor vehicle and the pin is movable within the groove as a result of an external action of force.

11 Claims, 3 Drawing Sheets

RADIATOR GRILLE FOR ASSEMBLY IN A RADIATOR GRILLE ARRANGEMENT

FIELD OF THE INVENTION

The invention relates to a radiator grille for assembly in a motor vehicle radiator grille arrangement.

BACKGROUND OF THE INVENTION

In motor vehicles, radiator grille arrangements are generally provided in which a radiator grille is assembled. A radiator grille of this type is as a rule rigidly assembled in the radiator grille arrangement by means of non-releasable snap connections, for example to a bumper or on a bonnet. However, a rigidly assembled radiator grille is disadvantageous for effective passer-by protection in the event of a front impact. Furthermore, a rigidly assembled radiator grille is already damaged at low speeds in the event of a front impact and this then necessitates expensive replacement of the radiator grille.

The recently introduced legal directives for improved passer-by protection in the event of a front impact have led to radiator grilles which are pivotally mounted in the radiator grille arrangement. The radiator grille can thus suitably pivot about an axis counter to the direction of travel in the event of an external action of force and this ensures better passer-by protection and helps to avoid disadvantageous damage to the radiator grille. However, pivotal attachment of the radiator grille necessitates expensive fastening elements which increase the constructional outlay and, in connection with this, also increase the production costs.

SUMMARY OF THE INVENTION

Accordingly, the invention is based on the object of providing a radiator grille for which, in the event of an external action of force, a deflective movement is possible with low outlay for construction.

The radiator grille in accordance with the invention is provided for assembly in a motor vehicle radiator grille arrangement, wherein assembly takes place in the radiator grille arrangement by means of first and second fastening means. The first and second fastening means thus are spaced from one another which substantially corresponds to a vertical extent of the radiator grille. In other words, the first and second fastening means are provided either on an edge, or else at least in the vicinity of a respective edge of the radiator grille, which edges are preferably an upper and a lower edge of the radiator grille. At least one of the fastening means of the first and second fastening means is formed by a link guide device consisting of a groove and a pin guided therein. The groove thus extends at least partially in the longitudinal axis of the vehicle, wherein the pin is movable within the groove as a result of an external action of force.

As a result of the spacing of the first fastening means from the second fastening means, corresponding to the vertical extent of the radiator grille or the height of the radiator grille, these fastening means are therefore each provided on edges of the radiator grille or in the vicinity thereof, said edges being opposite one another. For example, the first fastening means are provided on a lower edge of the radiator grille, while the second fastening means are provided in the area of the upper edge of the radiator grille.

If the vehicle is involved in a front impact, as a result of which a force substantially against the direction of travel acts on the radiator grille, the pin can move, guided in a defined manner, in the groove. An edge area of the radiator grille, in the vicinity of which, or on which, the link guide device is provided, can correspondingly advantageously give way according to the orientation of the groove to the rear in the direction of the longitudinal axis of the vehicle, in other words counter to the direction of travel. This reduces, for example, the risk of injury to a passer-by and in addition any possible damage to the radiator grille by breaking, shattering or the like is avoided (at low impact speeds).

In an advantageous configuration of the invention, both the first and the second fastening means are formed by the link guide device. Thus, a total of four pins can be moulded onto the radiator grille which engage in grooves which are adjacent thereto and can be movably guided therein. If, in the event of a front impact, a force acts against the radiator grille counter to the direction of travel, the radiator grille can move away as a whole to the rear, in that all pins are displaced to the rear in the grooves.

In accordance with an alternative advantageous embodiment, the first fastening elements are non-releasable, and can preferably be provided by at least one snap-on hook at the lower edge of the radiator grille. A particularly reliable fastening of the radiator grille can be achieved, for example, by a plurality of snap-on hooks which are each provided along a lower edge of the radiator grille and, in the assembled state of the radiator grille, engage, for example, with corresponding recesses formed in an area of the bumper.

Furthermore, the second fastening means can be formed by the above-described guide device. The link guide device is preferably provided in the area of the upper edge of the radiator grille. This ensures that the upper edge of the radiator grille can suitably give way to the rear in the event of a front impact. The displacement of the pin starting here inside the groove is further encouraged in that the radiator grille as a whole and also the bumper in the area where the radiator grille is non-releasably assembled thereon by means of the first fastening means, are slightly flexible and can be elastically deformed corresponding to the action of an external force.

In an advantageous refinement of the invention, the groove has at least one locking cam which reduces the groove in width and holds the pin in a fixed position. It is thus advantageously ensured that the radiator grille is reliably held in the fixed position by the link guided device in a so-called "normal position", in which there is no front impact and thus no disadvantageous rattling or the like occurs. Only when an external force acts counter to the direction of travel as a result of the front impact on the radiator grille, does the pin slide past the locking cam so it can then continue to move inside the groove.

In the embodiment having a total of four link guide devices, the locking cams, which are provided in the link guide devices provided at the lower edge of the radiator grille, can be formed in such a way that they only allow the respective pins to pass on reaching a larger pressure point than is the case in the link guide devices provided at the upper edge of the radiator grille. This has the advantageous effect that upon the action of only small forces on the radiator grille, only the upper edge gives way, while the radiator grille pivots downwards around the lower pins. Only when the described larger pressure point is exceeded are the pins of the link guide devices provided on the lower edge also displaced to the rear in the respective grooves past the locking cams, with the result that the radiator grille as a whole can deflect to the rear.

In a particularly advantageous configuration of the invention, the link guide device is formed in such a way that the pin is laterally moulded on to the radiator grille, and in that the groove is recessed in a part of the bumper. The bumper thus has a web which projects upwards from its upper side and has a so-called horn at its free end, which is adequately dimensioned in size for the provision of the groove. As an alternative to this, the groove may also be formed in a part of the bonnet.

In an alternative embodiment, the link guide device is formed in such a way that the pin is formed on the bumper or on the bonnet, while the groove is then correspondingly recessed in the radiator grille, in other words on a lateral edge thereof. The above-described advantageous effect that the edge of the radiator grille, in the vicinity of which the groove is formed in this case, can give way to the rear, is also fully ensured in this embodiment. To achieve this effect it is ultimately not decisive on which component the pin or the groove are provided; the essential aspect in this type of attachment consists solely in that the pin is received inside the groove and is movable in the groove only as a result of an external action of force.

The radiator grille in accordance with the invention can be particularly advantageously formed as a one-piece component. The injection moulding of plastics material is suitable for this, in particular. In this method, the moulding of the pin onto a side of the radiator grille, or alternatively the recessing of a groove in a side edge of the radiator grille is easily possible in one operation without any further after-treatment to the radiator grille being necessary.

The groove may extend in a linear or else in a curved manner in an advantageous refinement of the invention. The selected extent of the groove makes a defined rearward guidance of the radiator grille possible in the event of a front impact. If, for example the groove is extended in a curved manner with its end remote from the direction of travel being oriented in the direction of the bonnet, the radiator grille can dip to the rear below the bonnet in the event of a fast impact, so this produces a large giving way movement of the radiator grille with a correspondingly reduced risk of injury for a passer-by.

In a particularly advantageous configuration of the invention, the radiator grille has a small, to no, effective projection with respect to the bumper and/or the bonnet. An effective projection is taken to mean here a spacing of the outer faces of the respective components in the vertical orientation. The recently passed legal directives for effective passer-by protection require the effective projections between the front bumper edge and front radiator grille edge to be kept either small or reduced to zero, so the front radiator grille edge terminates flush with the front bumper edge. To take this fact into account it is particularly advantageous in the radiator grille in accordance with the invention for an outer edge area thereof, as described above, to be able to deflect to the rear. A small effective projection for passer-by protection is made possible by the radiator grille deflecting to the rear. This also allows the relevant Canadian and US-American and the European safety directives for crash tests to be complied with, such as, for example the pendulum test U.S.49 CFR 581. Moreover, this results in a favourable insurance assessment as no damage to the radiator grille occurs in the event of a front impact.

If, apart from the pin, the groove is also produced from a plastics material, which is the case, for example, when the groove is formed in a part of the bumper made of plastics material, particularly good, low-wear sliding properties of the pin inside the groove are produced and this ensures that the radiator grille deflects to the rear in an undisrupted manner.

Further advantages and configurations of the invention emerge from the description and the accompanying drawing.

It is obvious that the features mentioned above and those to be mentioned hereinafter cannot only be used in the respectively disclosed combination but also in other combinations or alone without departing from the scope of the present invention.

BRIEF DESCRIPTION OF THE DRAWINGS

The invention will be schematically described with the aid of an embodiment in the drawings and will be described in detail hereinafter with reference to the drawings, in which.

DETAILED DESCRIPTION OF THE PREFERRED EMBODIMENTS

Figure 1:
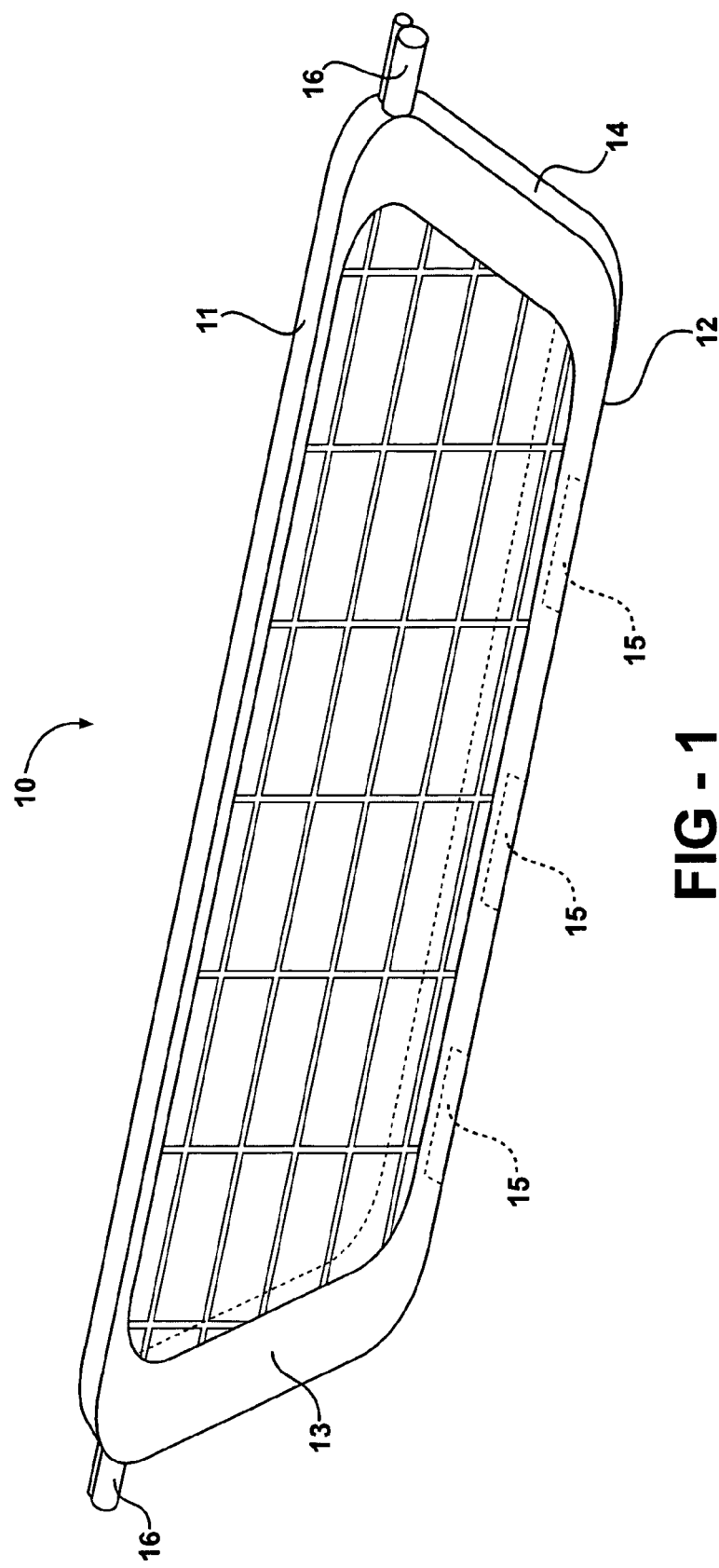
FIG. 1 shows a perspective side view of a radiator grille in accordance with the invention.

FIG. 1 shows a radiator grille 10 in a perspective side view in simplified form. In the embodiment shown here, the radiator grille 10 has a substantially rectangular or trapezoidal form, and correspondingly has an upper edge 11, a lower edge 12, a left-hand edge 13 and a right-hand edge 14. Formed on the lower edge 12 are a plurality of recesses 15 which are provided for engagement with snap-on hooks (cf. FIG. 2). Moulded onto the left-hand and right-hand edge 13, 14 of the radiator grille 10, adjacent to the upper edge 11, is a respective pin 16 which protrudes laterally substantially parallel to the upper and lower edge.

In terms of manufacturing technology, it is particularly advantageous to form the radiator grille 10 in one piece, for example by the injection moulding of a plastics material. In this case, the radiator grille can be economically produced in one operation, without any further after-processing being required. The plastics material used for this and also the wall thickness achieved during injection moulding for the moulded part are appropriately selected such that the radiator grille 10 has adequate rigidity and dimensional stability, so a rigid seat of the radiator grille in the radiator grille arrangement is ensured in a normal position, in which no front impact occurs. If the radiator grille 10 is injection-moulded from a plastics material, its dimensional stability can be advantageously further increased by adding short glass fibres into the plastics material granules.

The two pins 16 and the plurality of recesses 15 are arranged on the radiator grille 10 in such a way that they are spaced from one another corresponding substantially to a vertical extent of the radiator grille. In other words, the spacing of the pin 16 from the recesses 15 corresponds substantially to the height of the radiator grille 10.

Figure 2:
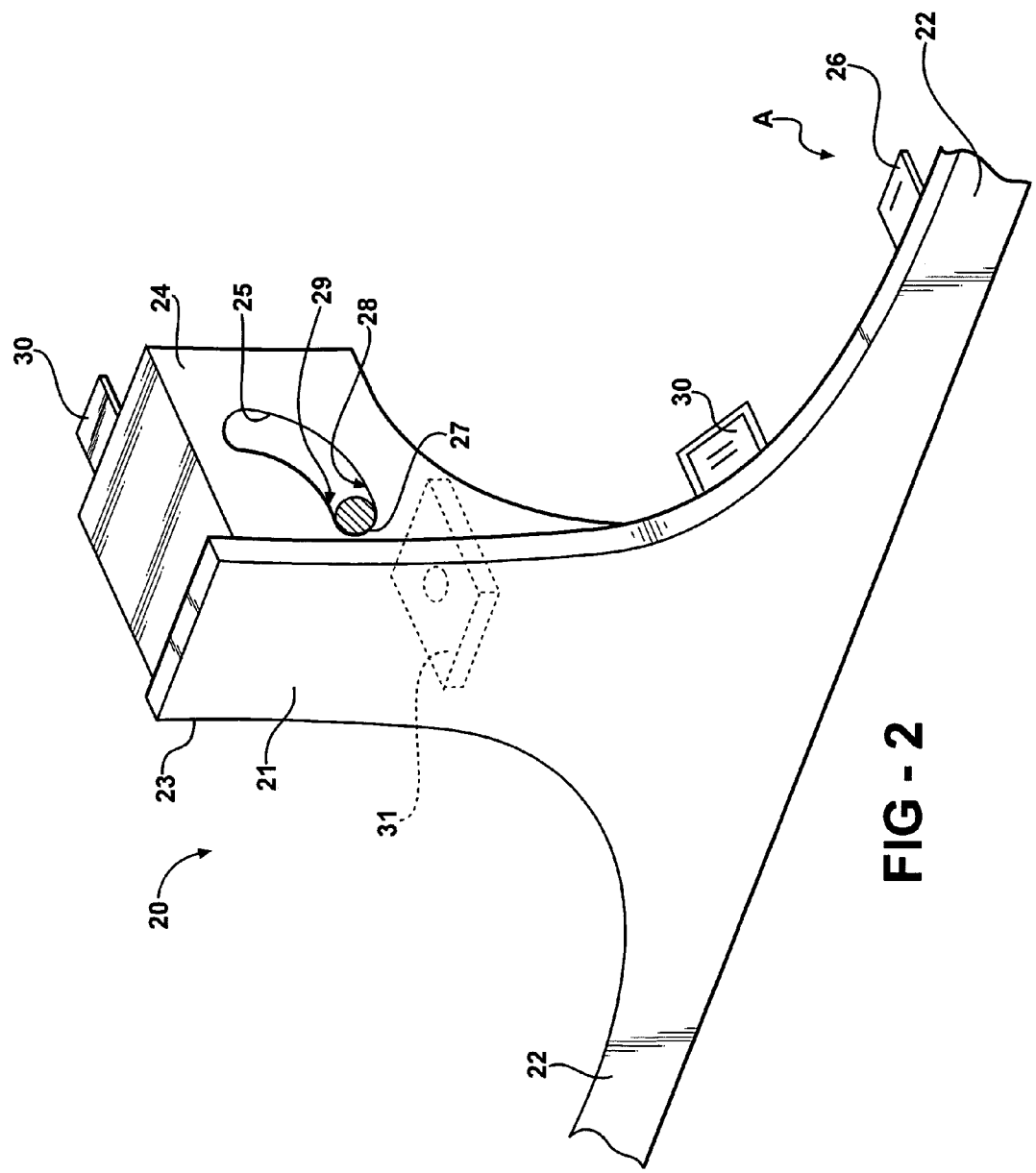
FIG. 2 shows a perspective view of part of a motor vehicle bumper.

FIG. 2 shows a lateral perspective view of a detail of a front bumper 20 on which the radiator grille is provided for assembly, as explained below. The bumper 10 has a so-called horn 21, i.e. a web-shaped element which extends upwardly (in the z-direction) from the upper side 22 of the bumper. The horn 21 has, at its free end 23, a part which extends counter to the direction of travel or to the rear (i.e.

in the x-direction). In a lateral flank 24, the horn has a groove 25 which extends in a curved shape in the z-direction. The length of the groove 25 may be, for example, 10 mm, while the depth thereof (i.e. in the y-direction) may be 5 mm, for example. The depth of the groove 25 is in any case large enough for the pin to be able to engage therein and be reliably guided therein in the x-direction.

Furthermore, the bumper 20, along its upper side 22, has a plurality of snap-on hooks 26 which are moulded on to the upper side and extend in the x-direction. With reference to FIG. 2, it should be understood that the bumper 20 has a total of two of the described horns 21 while the lateral flanks 24 with the grooves 25 formed therein are located opposite in each case. The plurality of snap-on hooks 26, in the embodiment shown here, for example a total of three, is provided in the area of the bumper 20 between the two horns 21. As an alternative to this, the snap-on hooks 26 may also be moulded onto the lower edge 12 of the radiator grille 10, the above-mentioned recesses 15 being formed on the upper side of the bumper 20.

The assembly of the radiator grille 10 in the radiator grille arrangement or on the bumper 20 is described herein-after.

The radiator grille 10 is attached to the bumper 20 in the direction of the arrow A (cf. FIG. 2), so the recesses 15 latch in each case with the snap-on hooks 26. The recesses and the snap-on hooks are thus designed such that the radiator grille 10 is non-releasably clipped to the bumper 20. The pins 16 of the radiator grille 10 are in-serted laterally into the respective grooves 25, so they come to rest on a front end 27 (pointing in the x-direction). The state in which the pin is inserted into the groove 25 is indicated in FIG. 2 by a hatched area 28.

The groove 25 also has two locking cams 29 which are provided on a point of the groove 25, so they lock the pin 16 inserted in the groove in a position in which the pin 16 abuts the front end 27 of the groove 25. If the recesses 15 and the respective pins 16 of the radiator grille 10 are assembled, as described above, on the bumper 20, in particular when the pins 16 abut the respective front end 27, a so-called normal position of the radiator grille 10 is thus defined. In this normal position, the radiator grille 10 either ends flush to the outside (x-direction) with the bumper 20, or else the front edge of the radiator grille has only a very small effective projection with respect to the front edge of the bumper in the x-direction.

In conjunction with a small, or no, effective projection of this type it is also important for effective passer-by protection, that in the event of a front impact, i.e. in the event of the external action of force counter to the direction of travel (in the x-direction) a corresponding edge of the radiator grille can deflect. Deflecting in this manner is ensured in the radiator grille 10 in accordance with the invention by guiding the two pins 16 in a respective groove 25. If an external force as a result of a front impact acts on the radiator grille 10 in the area of its upper edge 11, the pins 16 travel past the locking cams 29 and slide inside the groove 25 counter to the direction of travel to the rear, corresponding to the con-figuration of the two grooves 25. The rearward movement of the pins is defined by the orientation of the groove 25 in the lateral flank 24 of the horn 21. As the pins 16 on the radiator grille 10 are moulded thereon adjacent to the upper edge 11, in the event of a front impact, the upper edge 11 of the cooler grille can move to the rear according to the guidance of the pins 16 inside the grooves 25, in other words substantially in the x-direction.

As explained above, the snap-on hooks 26 are non-releasably latched into the recesses 15 of the radiator grille 10. The attachment of the radiator grille 10 to the bumper 20 by means of the snap-on hooks and the recesses is such that this connection also remains non-releasable in the case of a front impact. The described giving way movement of the upper edge 11 is therefore ensured in that, apart from the radiator grille 10, the bumper 20 also has a certain basic elasticity, whereby elastic deformation is possible in the event of an impact at low speeds. Like the radiator grille 10, the bumper 20 is also preferably produced from a plastics material, so said basic elasticity is provided in terms of material.

In the embodiment shown in FIG. 2 it can be seen that the groove 25 is not linear, but curves upwardly in the z-direction in a rear area, i.e. an area remote from the direction of travel. This orientation of the groove 25, in the event of a front impact, ensures that the radiator grille 10 with its upper edge 11 cannot only displace or deflect to the rear (in the x-direction), but also upwardly (in the z-direction). This advantageously ensures a dipping of the upper edge 11 below the bonnet 34 (cf. FIG. 3) of the motor vehicle, which prevents damage to the radiator grille, for example by shattering or the like. As an alternative to the embodiment shown here, the groove 25 may also, however, have a linear extent, in accordance with which the upper edge 11 of the radiator grille 10 can then deflect straight to the rear, in other words in the x-direction counter to the direction of travel in the event of a front impact.

The bumper 20, in a lower region of the horn 21 and also at the top on the free end 23 thereof, has further latching means 30, with which the bumper 20 can be fastened to adjacent fascia elements of the radiator grille arrangement or to the body. Formed in a central section of the horn 21 is a so-called z-support 31 (shown in dashed lines in FIG. 2), by means of which the bumper 20 can be suitably fastened to a body part (not shown), for example by screwing or the like.

Figure 3:
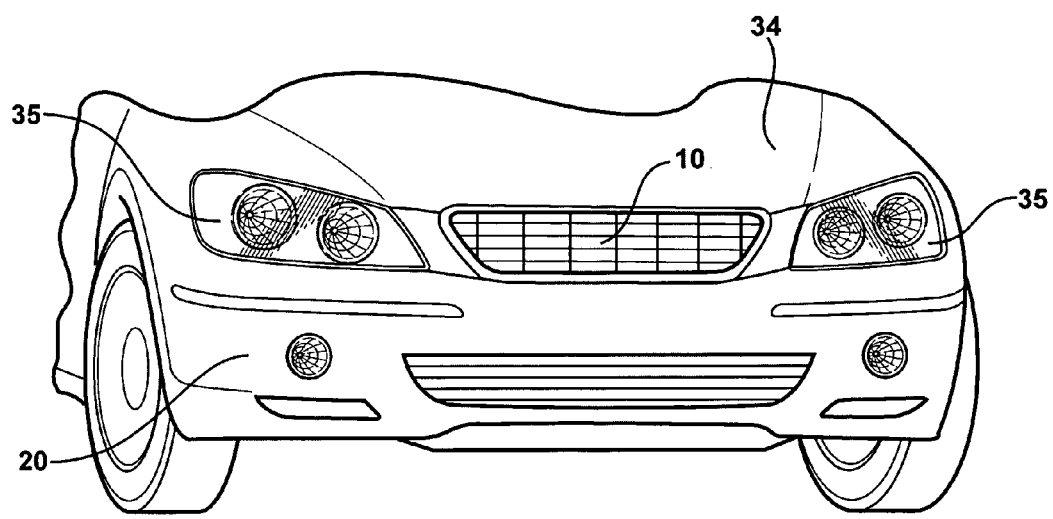
FIG. 3 shows a front view of a motor vehicle front end in sharply simplified perspective view, with a radiator grille in accordance with the invention mounted in a radiator grille arrangement.

FIG. 3 shows a front end part of a motor vehicle shown in a partial view with a bonnet 34, the bumper 20 and the radiator grille 10 in accordance with the invention, which as described above, is fastened to the bumper 20. The radiator grille 10 ends substantially flush with the surrounding parts bonnet 34, bumper 20 and a headlight housing 35 with respect to the outer skin, so in this embodiment the effective projection equals zero. An attachment of this type of the radiator grille to the bumper with a small or even no effective projection has significant advantages for passer-by protection.

As a result of the radiator grille 10 designed in accordance with the invention, high design requirements can be met by small, or no, effective projections, and the legal requirements for effective passer-by protection can also be met. As an alternative to the embodiment described above, with reference to FIGS. 1 to 3, the radiator grille 10 can also be assembled in a similar manner on the bonnet of the motor vehicle. Moreover, according to a kinematic reversal it is then also possible to form the groove 25 in the left-hand or right-hand edge 13, 14 of the radiator grille 10, while the pin 16 is then respectively moulded onto the side flank 24 of the respective horn 21.

In a further alternative embodiment, the snap-on hooks 26 provided on the lower edge 12 of the radiator grille 10 and the corresponding recesses 15 can, in each case, be replaced by link guide devices, so the radiator grille is assembled, for example, by a total of four link guide devices in the radiator grille arrangement. Advantageously, for the event of a front impact, not only is deflection of an edge of the radiator grille thus ensured, but also deflection of the radiator grille as a whole.

What is claimed is:

1. Radiator grille (10) for assembly in a motor vehicle radiator grille arrangement, which is assembled by means of first fastening means and second fastening means in the radiator grille arrangement, said first and second fastening means are spaced from one another substantially corresponding to a vertical extent of the radiator grille, wherein the first fastening means is provided on a lower edge (12) of the radiator grille (10) and is non-releasable and the second fastening means is formed by a link guide device consisting of a groove (25) and a pin (16) guided therein, wherein the groove at least partially extends in the longitudinal axis of the vehicle and the pin (16) is movable within the groove (25) as a result of an external action of force.

2. Radiator grille (10) according to claim 1, in which the first fastening means are formed by at least one snap-on hook (26).

3. Radiator grille (10) according to claim 1, in which the link guide device (16, 25) is provided in the area of an upper edge (11) of the radiator grille (10).

4. Radiator grille (10) according to claim 1, in which the pin (16) is formed on the radiator grille (10) and the groove (25) is formed in a part of a bumper (20).

5. Radiator grille (10) according to claim 1, wherein the groove (25) has at least one locking cam (29) which reduces the groove (25) in width and holds the pin (16) in a fixed position.

6. Radiator grille (10) according to claim 1, which is formed in one piece.

7. Radiator grille (10) according to claim 6, which is produced by injection moulding of plastic material.

8. Radiator grille (10) according to claim 1, wherein the groove (25) extends in a linear or curved manner.

9. Radiator grille arrangement with a radiator grille (10) according to claim 1.

10. Radiator grille arrangement according to claim 4, in which the bumper (20) is produced from a plastic material.

11. Radiator grille (10) for assembly in a motor vehicle radiator grille arrangement, which is assembled by means of first fastening means and second fastening means in the radiator grille arrangement, said first and second fastening means are spaced from one another substantially corresponding to a vertical extent of the radiator grille, wherein at least one of the fastening means of the first and second fastening means is formed by a link guide device consisting of a groove (25) and a pin (16) guided therein, wherein the groove at least partially extends in the longitudinal axis of the vehicle and the pin (16) is movable within the groove (25) as a result of an external action of force, the groove (25) including at least one locking cam (29) which reduces the groove (25) in width and holds the pin (16) in a fixed position.

* * * * *